Dec. 14, 1965  D. J. GRIBBLE ETAL  3,223,070
DAIRY ESTABLISHMENT
Filed Nov. 5, 1963  3 Sheets-Sheet 1
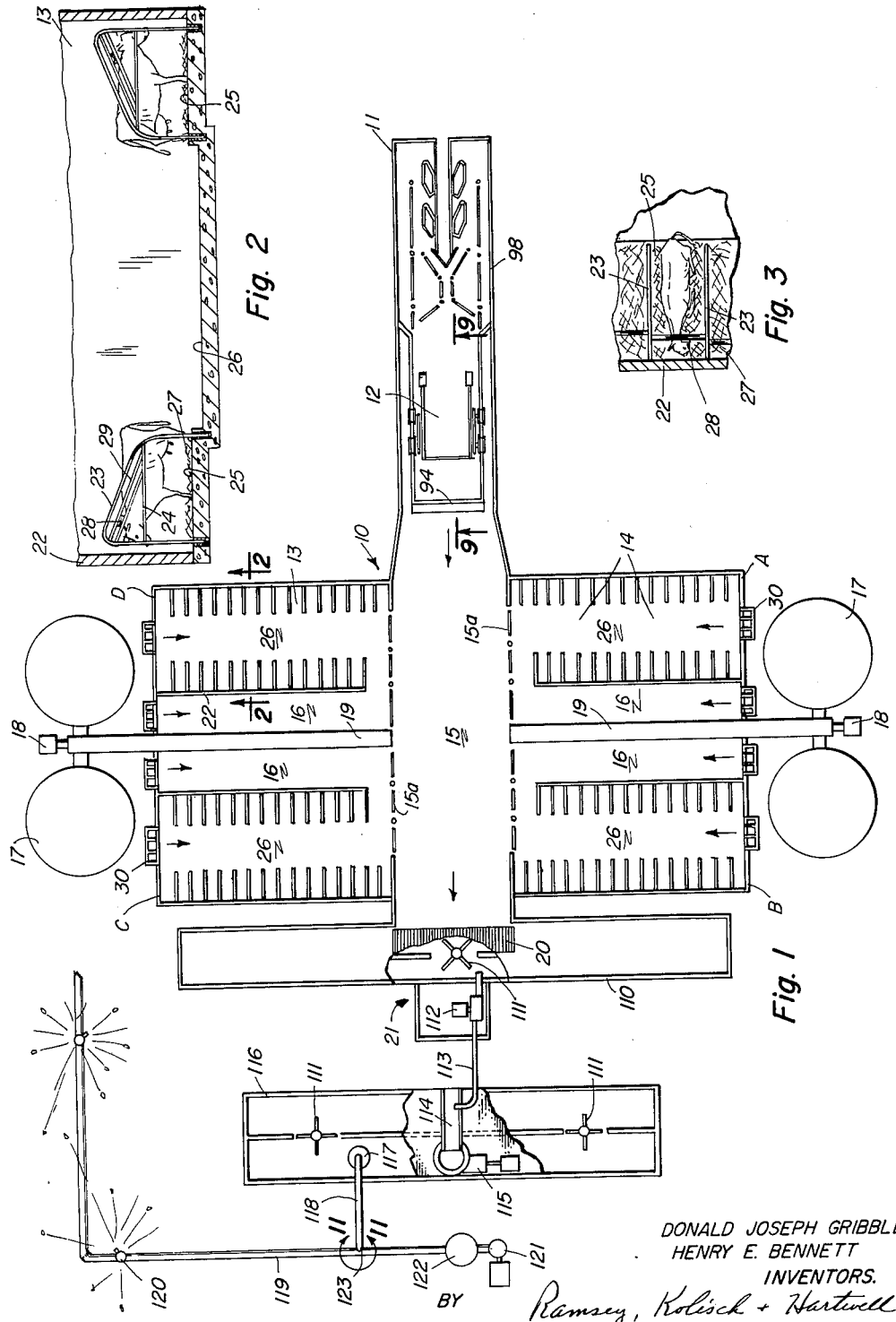
DONALD JOSEPH GRIBBLE
HENRY E. BENNETT
INVENTORS.
BY Ramsey, Kolisch + Hartwell
ATTORNEYS Dec. 14, 1965    D. J. GRIBBLE ETAL    3,223,070
DAIRY ESTABLISHMENT
Filed Nov. 5, 1963    3 Sheets-Sheet 2
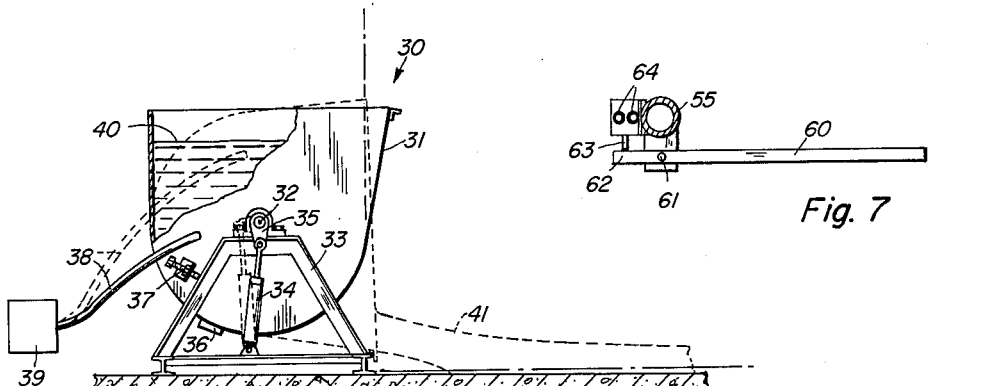
Fig. 4
Fig. 7
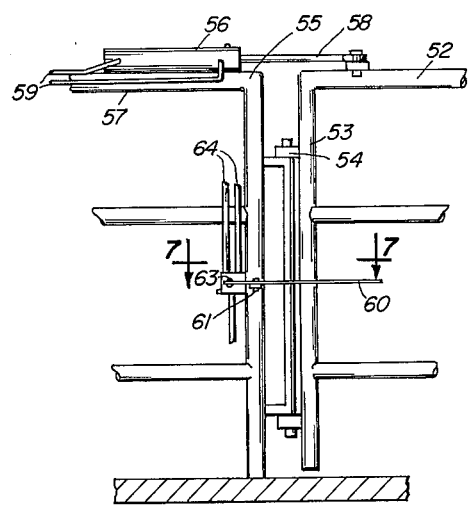
Fig. 6
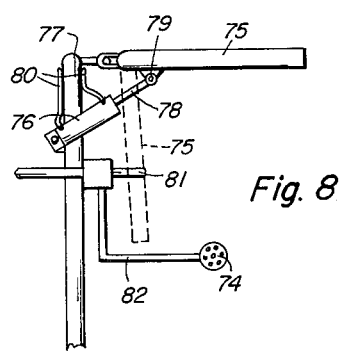
Fig. 8
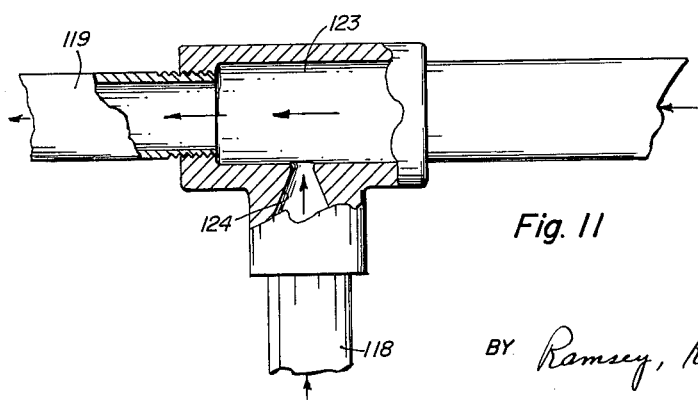
Fig. 11
DONALD JOSEPH GRIBBLE
HENRY E. BENNETT
INVENTORS.
BY Ramsey, Kolisch + Hartwell
ATTORNEYS

DONALD JOSEPH GRIBBLE
HENRY E. BENNETT
INVENTORS.

BY Ramsey, Kolisch & Hartwell
ATTORNEYS

United States Patent Office 3,223,070
Patented Dec. 14, 1965

3,223,070
DAIRY ESTABLISHMENT
Donald Joseph Gribble and Henry E. Bennett, Santa Rosa, Calif., assignors to AG Pro Inc., Santa Rosa, Calif., a corporation of California
Filed Nov. 5, 1963, Ser. No. 321,612
3 Claims. (Cl. 119—16)

This invention relates to method and equipment for care and maintenance of domesticated food-producing animals. While the invention is particularly applicable to the care and maintenance of milk-producing cows, and will be described in relation to the construction of a dairy barn and care of cows, it is applicable to other domesticated animals.

Ever since man domesticated animals, their care and maintenance has involved a great amount of hand labor, particularly in the case of milk-producing animals such as cows which are kept for periods of time in a barn. It is recognized today that in order to achieve optimum results in milk production, cows must be properly fed and cared for and milked under strictly sanitary conditions. The removal of cow offal from a barn is as much of a task today as it was in ancient times. In order to produce good, sweet milk, it is important that there be no accumulations of cow manure and urine in the barn because milk readily absorbs odors directly as well as through the respiratory system of the cows. Furthermore, accumulations of manure in the usual piles or lagoons employed in connection with dairy operations are obnoxious and highly unsanitary. They are breeding grounds for flies, mosquitoes and all forms of pests as well as a prime source of water contamination. Seepage and runoff from manure accumulations contaminate surface as well as subsurface water supplies. According to a feature of our invention, this is completely eliminated and cow offal is continuously removed from a barn and put into condition for expeditious use as fertilizer.

Under known dairying techniques cows are maintained, when the weather permits, in pastures near the milking barn and are periodically brought into the barn for the purpose of milking and then returned to pasture. Movement of cows between pasture and barn is time consuming and entails considerable man hours. Permitting cows to graze a pasture is not the most efficient way of feeding them. When cows are turned loose in a pasture, they graze it unevenly, trample much of the feed, and the manner in which their manure is deposited on the ground destroys the feed with which it comes in contact and doesn't do the ground much good. Furthermore, flies and other undesirable pests are attracted to the area. From the foregoing, it will be appreciated that a given field will produce more and better feed if the feed is removed therefrom and fed to the cows rather than permitting them to graze.

The object of the present invention is to provide a really completely sanitary dairy system which produces uniformly high-quality milk in greater quantities per cow than heretofore produced at substantially lower cost and with much greater ease to the producer.

The object of the invention is achieved by maintaining a herd of dairy cows under controlled, sanitary conditions. Pasturing of cows is completely eliminated. The cows are maintained in a large barn having various areas in which the cows rest, eat, and are milked on a controlled cyclical schedule. Cows are known to be creatures of habit and they readily adapt themselves to moving at the desired times from one area to another. Substantial hand labor and man hours are eliminated by keeping the cows relatively confined and the quantity and quality of their milk is markedly enhanced.

According to a feature of the present invention, the areas in which the cows are confined are so constructed that they can be periodically flushed clean by water which is collected and utilized thereafter. Some of the waste products which accumulate on the floor of a dairy barn are manure, urine, feed, stall bedding material, and milk. All of this waste is removed by the flushing water and formed into a fertilizer slurry which may be applied by suitable sprinkler irrigation mechanism to the fields surrounding the barn. The slurry is diluted to an extent that there is no objectionable odor and flies and other pests are not attracted. There is little fertilizer value loss because the slurry is applied while still relatively fresh to the soil in a condition in which it can be easily absorbed. An application of slurry to a field may be followed by an application of clear water which will wash out the sprinkler system and clean the foliage in a field. Much greater soil productivity is thereby achieved and feed, as well as other agricultural products, can be produced in greater and better quantity. If desirable, it is also possible to transport the slurry by tank cars or trucks to locations remote from the barn for use as fertilizer.

According to a feature of the invention, the areas over which the cows are free to roam in the barn are of a hard-paved surface, such as concrete, and are on a slight angle so as to permit drainage in a desired direction into collecting tanks. Water-dispensing means are so constructed and positioned that they can be automatically actuated at predetermined times to release relatively large quantities of water for washing the barn floors. The wash water is collected for subsequent fertilizer use, as previously mentioned.

According to another feature of the invention, the rest stalls of the cows are constructed so that a cow's body can comfortably fit in the stall, but cow offal is deposited outside the stall on the concrete floor which is flushed.

According to still another feature of the invention, just before a cow moves into milking position, the cow's udder and surrounding areas, such as flanks and lower rear legs are washed clean. The cow is also stimulated for easier and quicker milking. In this process, the cow's udder is subjected to a spray of warm water and thereafter primed for milking. This stimulates the cow to let her milk down and immediately thereafter the cow is milked. A cow which is milked according to the method of the invention not only produces more and better milk, but udder damage and mastitis are materially reduced and the period of time over which a cow will be productive is increased.

According to still another feature of the invention, the cows just prior to milking pass through a series of stalls having gates which are operated by the movement of the cows whereby each cow will be in a milking station at a desired time and in optimum milking condition.

These and other features of the invention will be explained in greater detail in conjunction with the drawings, in which:

FIG. 1 is a schematic top plan view of a dairy installation in accordance with the present invention;

FIG. 2 is a section on the lines 2—2 of FIG. 1, showing cows standing in resting stalls;

FIG. 3 is a top plan view of a cow lying down in a resting stall;

FIG. 4 is a side elevation of a water-dispensing dump tank according to the invention;

FIG. 6 is a section on lines 6—6 of FIG. 5, showing a gate;

FIG. 7 is a section on lines 7—7 of FIG. 6, showing mounting of control rod and gate;

FIG. 8 is a top plan view of a portion of the front gate and spray-washing mechanism of the washing stall of FIG. 5;

FIG. 11 is an enlarged side elevation partly in section on lines 11—11 of FIG. 10, showing a venturi connection.

Figure 5:
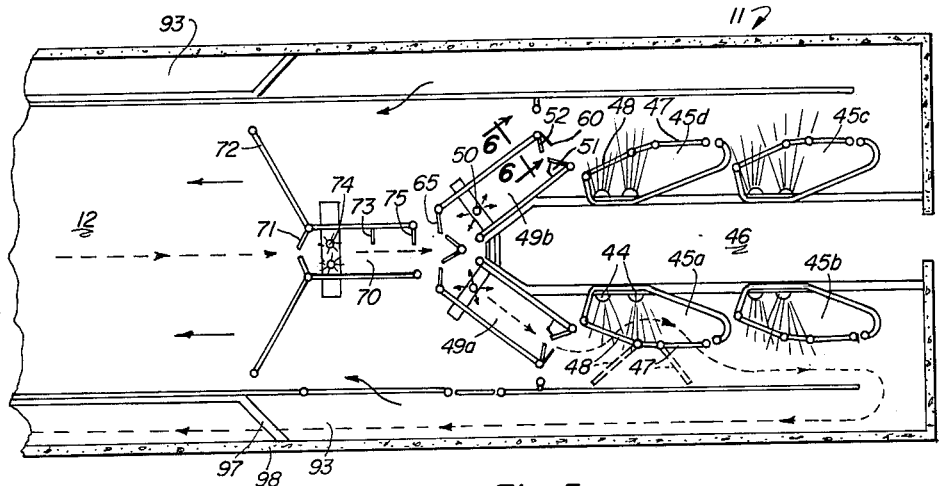
FIG. 5 is an enlarged top plan view of the milking area of the barn of FIG. 1.

Referring to FIG. 1, there is generally indicated at 10 a building enclosure or barn which is divided into various areas. Milking wing 11 has a cow-holding area 12 in which cows are confined just prior to milking. The cows are maintained in groups or units indicated at A, B, C, D in FIG. 1. The cows from a particular group are milked together and the milking times of the various groups may be arranged so as to provide for a convenient schedule of milking the cows and cleansing of the various areas of the barn. Each cow has her own stall 13 within a resting area 14 that corresponds with her particular group. Each resting area opens on to a central transfer or roaming area 15 and feeding areas 16. Gates 15a control movement of the cows from the rest and feeding areas into the transfer area. The cows are not confined to their stalls and are free to move between rest and feeding areas as they desire. This will, of course, usually be when feed is made available to them in the manner about to be described.

Feed-storage silos 17 are connected by suitable mechanically driven and controlled conveyer means 18 to feed troughs 19 in feeding areas 16. Mechanism 18 may be adjusted to deliver the amount, type, and frequency of feed desired to troughs 19. If desired, each silo can be filled with a different type of feed which is metered in predetermined amounts to the automatic conveyer mechanism which deposits it in the feed trough where it is freely accessible to the cows.

It will be appreciated that the number of groups of cows, as well as the number of cows in each group, can be varied and the construction of the barn will be appropriately adjusted.

All of the floor area of the barn over which cows are permitted to walk is covered by a relatively smooth, hard surface, such as concrete, which will satisfactorily withstand repeated washings. The floors are sloped so as to permit drainage towards grate 20 of a fertilizer recovery and utilization system, generally indicated at 21. A uniform slope of the barn floors at a rate of around three feet per hundred feet has been found to be satisfactory.

As best seen in FIGS. 2 and 3, each of the cow-resting stalls 13 is defined by a front wall 22, side-dividing and cross members 23, 24, and floor 25 which is raised above the level of alley floor 26. The length and width of a stall 13 is such that a milking cow of a particular breed can comfortably accommodate herself in a stall in either standing or lying position. Commercially operated dairies usually milk only cows of a particular breed whose sizes do not vary materially. However, if for any reason it is necessary to accommodate cows of varying sizes and dimensions, the stalls can be varied by use of a movable neckboard 28 on sloped guide rails 29 whereby the board may be adjusted depending on the length and height of a particular cow. The important consideration in either case is that the size of the stall is such that all cow offal falls outside the stall and is deposited in alley 26, which is sloped as previously mentioned. The cows are prevented from turning in their stalls and their bedding 27 remains clean and dry and off of the floor areas subjected to water flushing, as hereinafter described, At the uphill end of each alley 26, means for releasing a relatively large amount of water to flush the alleys clean are provided. The water-releasing means may conveniently take the form of dump tanks 30 (FIG. 4), comprising a large water-holding container 31 pivotally supported at either end on stub shafts 32 suitably mounted on frames 33 resting on alley floor 26. Shock absorbers 34 are connected by cranks 35 to shafts 32. Counterweight 36 is mounted on the back side of container 31. Adjustable return stops 37 are mounted on either end of container 31 and adapted to engage the frame 33 to position the tank in upright position. Water-inlet hose 38 is connected at one end to the tank and at another end to water-control means 39, which may be adjusted depending on the desired rate of water flow in the tank. When container 31 is filled above line 40, the tank tips forward and dumps a sheet of water 41 on the floor. The empty tank is returned to upright position by the counterweight for refilling. It will be appreciated that a tank may be adjusted automatically to release desired amounts of flushing water on a cyclical basis, such as every four hours.

Turning now to the milking wing, as seen best in FIGS. 1 and 5, four milking station stalls 45a, 45b, 45c, 45d are positioned around a pit 46. Inside the pit an operator stands and applies connections from the automatic milking machines (not shown) to the cows. Each milking stall has a pair of air-operated gates 47, 48 which are controlled by the operator through suitable control mechanism (not shown). When operated, the gates swing open to a position shown in dotted lines in FIG. 5, permitting a cow which has been milked to leave the stall and the next cow to be milked to enter the stall. Water sprays 44 continuously spray water on the floor in the milking stalls in order continuously to remove spilled milk and any cow offal. Immediately behind milking stalls 45a and 45d there are two milk stimulation stalls 49a, 49b, each having sprays 50 for directing warm water or warm drying air against the udder and surrounding areas of a cow standing in the stall. A feed box 51 is provided at the forward end of each stimulation stall into which, through automatic means (not shown), a predetermined amount of feed is placed in the box each time a cow comes in the stall.

Referring to FIGS. 6 and 7, there will be explained the construction and operation of gate 52 in stall 49b which is similar to the other air-operated gates employed in the other stalls in the milking area. Post 53 of gate 52 is hinged at 54 to post 55 of the stall. Cylinder 56 mounted on rail 57 is connected by piston 58 to gate 52. Air lines 59 are connected at one end to cylinder 56 and at the other end (not shown) to actuating means controlled by opening of gates 47, 48 of milking stalls 45c, 45d, whereby when one of those milking stalls is free, gate 52 opens and a cow within stall 49b is free to enter the open milking stall. Control rod 60 is pivotally mounted at 61 on post 55 at the front of the stall and operated by the cow as she leaves the stall. Back end 62 of rod 60 is adapted to engage plunger 63 of air lines 64 which control closing of gate 52 behind the cow and opens a gate 65 permitting a cow to pass from washing stall 70 into whichever of stalls 49a or 49b is open.

A cow enters washing stall 70 through gates 71 flanked by guide rails 72 when the gates are opened under control of gate 48 of a milking stall opening. As a cow moves into stall 70, she engages a control rod 73 in the stall that actuates spray heads 74 positioned in the floor of the stall to eject a spray of water that will wash the udder and surrounding areas of the cow standing in the stall. Heads 74 are turned off when gate 75 of the stall opens to permit a cow to leave the washing stall.

Referring to FIG. 8, mechanism for controlling spray heads 74 is shown. Cylinder 76 is mounted on post 77 of the stall. Piston 78 of the cylinder is connected at 79 to gate 75. Operation of piston 78 is by air lines 80 which are controlled by opening of gates 65. When gate 75 is in closed position shown in dotted lines, it engages plunger 81 permitting water to pass through conduit 82 to heads 74. Opening of gate 75 disengages plunger 81 and shuts off water to heads 74.

When the cows are ready for milking, they will naturally congregate in the milking area. In order to expedite their movement through the milking stations and segregate the cows who are to be milked, there is provided in holding area 12 which leads into the milking area, a crowding device generally indicated at 85 (FIG. 9) one-half of which is shown, the other half being the same. Rollers 86 ride along top rail 87 on either side of the holding area. Transverse rails 88 extend between each half of the crowding device and are connected to one end of lever 89 which is pivotally mounted at 90 to side plate 91 hanging from wheels 86. A weight 92 is provided at the other end of lever 89. When the lever is pushed down, rails 88 are swung up permitting cows to pass underneath. When the cows are all inside the rails, they are lowered and as it is desired to move cows through holding area 12 in the direction of dashed arrow lines (FIG. 5), the crowding device is moved forwardly in the direction of the solid arrow (FIG. 9) by pulling cable 83. A stop 84 is positioned at the end of rail 87 to limit backward movement of the crowding device. The cows will one at a time then proceed through the washing, milk stimulation, and milking stalls in the direction of the dotted arrows (FIG. 5). Once a cow has been milked, she will leave the milking area of her own volition down cow-return alleys 93 to area 15, and to her stall or feeding area. The system of gates and rails will prevent her from mingling with cows in the holding area awaiting milking.

Figure 9:
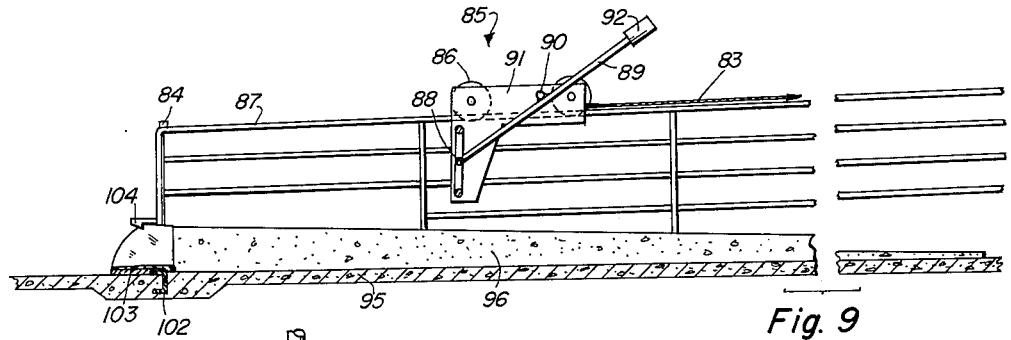
FIG. 9 is a side elevation partly in section of a portion of the cow-holding area, dam in lowered position, and crowding mechanism.
Figure 10:
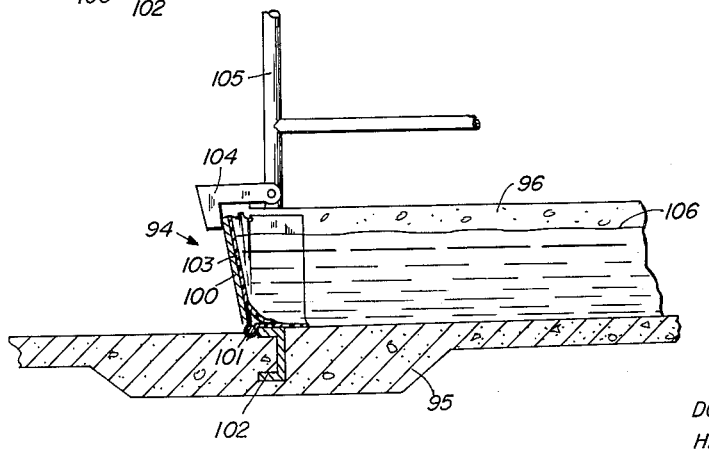
FIG. 10 is an enlarged side elevation partly in section of a portion of FIG. 9, showing the dam in raised position.

Near the juncture of holding area 12 and transfer-roaming area 15, a dam 94 is provided for controlling flow of flushing water from the milking area. Floor 95 of the milking area slopes into area 15 which slopes toward grate 20 at about a pitch of 3' in 100'. Water-retaining walls 96 extend along either side of the holding area. Wings 97 extend from one end of walls 96 to side walls 98 of the milking wing and dam 94 extends between the other two ends of the water-retaining walls. The dam comprises a steel plate 100 (FIGS. 9, 10) which at 101 is hinged to a channel iron 102 embedded in floor 95. A sheet of tough rubber-like material 103 prevents leakage of water between the plate and channel and along the sides when the dam is raised as shown in FIG. 10. A catch 104 on post 105 holds the dam closed when it is in raised position. When the catch is released, the dam is free to fall flat on the floor, as shown in FIG. 9. It is in the latter position while a group of cows are passing into the holding area preparatory to milking. Once all the cows are confined in area 12, the dam is raised to retain flushing water coming in the milking area. Water behind the dam may rise up to line 106. After a group of cows have been milked, dam 94 is dropped and a relatively large volume of water is released into area 15 which is thereby cleansed.

It will be seen from the foregoing that all of the water which is used to flush the floors of the barn drains toward grate 20 which is so constructed as to permit the water and entrapped offal to collect in tank 110 of the fertilizer recovery and utilization system (FIG. 1). Tank 110 may conveniently be placed underground and an agitator 111 in the tank mixes the water and offal into a slurry. Pump 112 and pipe 113 pass the slurry through a dewatering device 114 from which excess water is removed, and through a grinder 115 which grinds all large solids, feed, rest stall bedding material, etc., to a size small enough to pass through a sprinkler. The resulting slurry is maintained in another storage tank 116 having agitators 111 therein. When fertilizer slurry is desired, pump 117 pumps it from the tank into pipes 118, 119 connected to sprinklers 120 in the fields adjoining the barn. There is also connected to pipe 119 a source of clean water and pump 121 which pumps water under pressure into pressure tank 122.

Referring to FIG. 11, there is shown one way—venturi action—of passing slurry through the sprinkler system. At the juncture of pipes 118, 119 there is a coupling 123 and a restricted orifice 124 in pipe 118. Slurry under pressure passes through orifice 124 where it is mixed with clean water under pressure from tank 122 and moves in the direction of the arrows to the sprinklers. In place of the venturi a high presure centrifugal or other suitable type of pump could be used in the system.

It will be appreciated that the amount and mixture of fertilizer slurry can be controlled as desired. Also, after fertilizer slurry has been deposited in the fields, clean water can be sent through the pipes in order to wash them out and any fertilizer remaining on the foliage. In this way the fertilizer is washed into the ground, and there are no obnoxious odors or attraction for flies and other pests. If, in the winter or at other times, it is not desired to fertilize the adjoining fields, the storage tanks may be emptied into tank cars or the like for transportation of the fertilizer to other areas where it may be utilized.

It will be noted from the foregoing description of the invention that personnel to operate a dairy barn have been greatly reduced from that normally employed and that the cows to a great extent have been left free to move of their own volition. It has been found that cows are creatures of habit and learn a routine quickly, particularly where it is to their comfort and advantage. Cows therefore lend themselves readily to the desired cyclical movements from one area to another at the desired times with a minimum of human effort.

While the system has been explained with respect to specific embodiments of the invention, it will be appreciated by those skilled in the art that various changes may be made in the construction without departing from the scope of the invention as defined in the appended claims.

It is claimed and desired to secure by Letters Patent:

1. A dairy barn for cows and the like including a smooth, evenly contoured paved surface forming a floor providing a walking surface for cows in the barn, drain means for draining wash water from such floor opening to the top of the floor, said smooth, evenly contoured surface which forms such floor sloping toward said drain means whereby wash water discharged on the floor may be collected and disposed of through said drain means, said barn further including multiple rest areas with individual stalls for each cow and with each of said stalls having a bottom which is also of smooth pavement, but which is disposed at an elevation above the paved surface forming the floor, said stalls being dimensioned so that a cow can comfortably stand or lie in the stall, but offal from the cow falls outside the stall bottom and onto the floor providing the walking surface in the barn, said barn further including defined feeding areas having feeding troughs with means for discharging feed to the troughs, a cow-holding area, a milking area and a transfer area all bottomed with the walking surface forming said floor in the barn, and floor-washing means for washing the floor providing the walking surface in the barn where said floor bottoms said feeding, holding, milking and transfer areas operable to send wash water flowing over the floor with such water washing any cow offal thereon into said drain means, said floor-washing means including means located over a region of said floor which is uphill from said drain means constructed to collect water as a pool above said floor and operable after such collection of water as a pool to disperse the water as a sheet of water over said floor.

2. The barn of claim 1, wherein said floor-washing means comprises a water dump tank disposed above the floor, and a mounting for the tank including means whereby the same may be tipped thereby to allow the contents of the tank to escape abruptly from adjacent the top of the tank and to cascade onto the floor to form a sheet of water thereon.

3. The barn of claim 1, wherein said floor-washing means comprises a dam for damming and collecting water as a pool directly on the floor, and such dam is abruptly openable to send such water as a sheet over the floor toward said drain means.

References Cited by the Examiner

UNITED STATES PATENTS

| | | | |
|---|---|---|---|
| 1,968,564 | 7/1934 | Luks. | |
| 1,981,417 | 11/1934 | Kreutzer | 119—16 |
| 1,981,418 | 11/1934 | Kreutzer | 119—16 |
| 2,081,947 | 6/1937 | McCornack | 119—16 X |
| 2,233,766 | 3/1941 | Bogert | 119—16 |
| 2,294,781 | 9/1942 | Ingraham | 119—27 X |
| 2,691,359 | 10/1954 | Anstiss | 119—20 |

FOREIGN PATENTS

| | | |
|---|---|---|
| 1,246,418 | 10/1960 | France. |
| 914,649 | 1/1963 | Great Britain. |

OTHER REFERENCES

Cattle Shelters and Equipment for South Carolina, Extension Agricultural Engineering Handbook No. 2, Dec. 1958, pp. 21 and 26.

The Way Cows Will be Milked on Your Farm "Tomorrow," Babson Bros., Dairy Research Service, 1959, p. 13.

SAMUEL KOREN, *Primary Examiner.*

HUGH R. CHAMBLEE, ALDRICH F. MEDBERY,
*Examiners.*